United States Patent
Chida

(10) Patent No.: US 11,947,907 B2
(45) Date of Patent: Apr. 2, 2024

(54) ANALYSIS DEVICE, ANALYSIS METHOD, AND ANALYSIS PROGRAM

(71) Applicant: NIPPON TELEGRAPH AND TELEPHONE CORPORATION, Tokyo (JP)

(72) Inventor: Nariyoshi Chida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/799,270

(22) PCT Filed: Feb. 21, 2020

(86) PCT No.: PCT/JP2020/007268
§ 371 (c)(1),
(2) Date: Aug. 12, 2022

(87) PCT Pub. No.: WO2021/166271
PCT Pub. Date: Aug. 26, 2021

(65) Prior Publication Data
US 2023/0071959 A1   Mar. 9, 2023

(51) Int. Cl.
*G06F 40/20*   (2020.01)
*G06F 40/205*   (2020.01)

(52) U.S. Cl.
CPC ................. *G06F 40/205* (2020.01)

(58) Field of Classification Search
CPC ....... G06F 40/205; G06F 40/211; G06F 8/427
See application file for complete search history.

(56) References Cited

U.S. PATENT DOCUMENTS

| | | | | |
|---|---|---|---|---|
| 2012/0065960 | A1* | 3/2012 | Iwama | G06F 40/205 704/9 |
| 2012/0266244 | A1* | 10/2012 | Green | H04L 63/145 726/24 |
| 2020/0082413 | A1* | 3/2020 | Tseng | G06F 21/561 |

OTHER PUBLICATIONS

Article entitled "Is Stateful Packrat Parsing Really Linear in Practice? A Counter-Example, an Improved Grammar, and Its Parsing Algorithms" by Chida et al.,, dated Feb. 23, 2020 (Year: 2020).*
Article entitled "Parsing Expression Garammars: A Recognition-Based Syntactic Foundation", by Ford, dated Jan. 16, 2004 (Year: 2004).*
Kuramitsu, "Nez: Open Grammar Language and Tools", Nez project, Available Online At: http://nez-peg.github.io/, 2015-2016, 2 pages.

(Continued)

*Primary Examiner* — Mahesh H Dwivedi
(74) *Attorney, Agent, or Firm* — XSENSUS LLP

(57) ABSTRACT

An analysis device includes processing circuitry configured to perform parsing on a first character string based on a grammar described in a PEG in which a variable is associated with a predetermined terminal symbol, add, to the variable, an element in which a predetermined attribute is imparted to a part of the first character string, the part being a second character string analyzed as corresponding to the terminal symbol, extract an element that is latest from elements of each predetermined attribute from the variable, and determine whether the element extracted satisfies a predetermined condition regarding a context.

9 Claims, 17 Drawing Sheets

(56) References Cited

OTHER PUBLICATIONS

Gietzen, "Pegasus: Super-easy PEG Parsing for .NET", Pegasus, Available Online At: http://otac0n.com/Pegasus/, Retrieved from the Internet on: Jan. 21, 2020, 1 page.

Kuramitsu, "A Symbol-Based Extension of Parsing Expression Grammars and Context-Sensitive Packrat Parsing", In Proceedings of the 10th ACM SIGPLAN International Conference on Software Language Engineering, SLE 2017, ACM, pp. 26-37.

Ford, "Packrat Parsing: Simple, Powerful, Lazy, Linear Time", Functional pearl, In Proceedings of the Seventh ACM SIGPLAN International Conference on Functional Programming ICFP' 02, ACM, 2002, pp. 36-47.

Chida Nariyoshi, "PoC Implementation of parser generators based on existing/SG/CMstateful packrat parsing", zenodo [online], and Zip file "artifact.zip", Jan. 21, 2020 [Search date: Sep. 25, 2023], URL: https://zenodo.org/record/3607141.

Japanese Office Action dated Oct. 3, 2023 in corresponding Japanese Patent Application No. 2022-501600 (with machine generated English translation), 6 pages.

* cited by examiner

| e | ::= | | |
|---|---|---|---|
| | ε | Empty | |
| | α | Character | |
| | A | Nonterminal | |
| | ee | Sequence | |
| | e/e | Ordered choice | |
| | &e | And-predicate | |
| | !e | Not-predicate | |
| | bind$_m$(υ, e$_p$) | Bind for match | |
| | bind$_e$(υ, e$_p$) | Bind for exists | |
| | match(υ, e$_p$) | Backreference (match) | |
| | exists(υ, e$_p$) | Backreference (exists) | |
| | scope(e) | Scope | |

| e$_p$ | ::= | | |
|---|---|---|---|
| | ε | Empty | |
| | α | Character | |
| | A$_p$ | Nonterminal | |
| | e$_p$e$_p$ | Sequence | |
| | e$_p$/e$_p$ | Ordered choice | |
| | !e$_p$ | Not-predicate | |

| Algorithm 1: parse($A, i, E_m, E_e$) |
|---|
| 1:    $key = (A, i, \text{filter}(E_m))$ |
| 2:    if $key \in \text{dom}(M_s)$: |
| 3:    return $M_s[key]$ |
| 4:    $(j, E'_m, E'_e) = \text{parse}(R(A), i, E_m, E_e)$ |
| 5:    $M_s = M_s[key \mapsto (j, E'_m, E'_e)]$ |
| 6:    return $(j, E'_m, E'_e)$ |

Fig. 8

| 0 | 1 | 2 | 3 | 4 | 5 | 6 | 7 | 8 | 9 |
|---|---|---|---|---|---|---|---|---|---|
| v | a | ^ | v | b | ^ | v | / | a | ^ |

| H | N |
|---|---|
| ? | ? |
| ? | ? |
| ? | ? |
| ? | ? |
| ? | ? |
| ? | ? |
| ? | ? |
| ? | ? |
| ? | ? |
| ? | ? |

| H | N |
|---|---|
| ? | ? |
| ? | ? |
| ? | ? |
| ? | ? |
| ? | ? |
| ? | ? |
| ? | ? |
| ? | ? |
| ? | 2 |
| ? | ? |

Fig. 9

| H | N |
|---|---|
| ? | ? |
| ? | ? |
| ? | ? |
| ? | ? |
| ? | ? |
| ? | 5 |
| ? | ? |
| ? | ? |
| ? | 2 |
| ? | ? |

Fig. 10

| | H | N |
|---|---|---|
| | ? | ? |
| | ? | 2 |
| | ? | ? |
| | ? | ? |
| | ? | 5 |
| | ? | ? |
| | ? | ? |
| | ? | fail |
| | ? | ? |
| | ? | ? |

| H | N |
|---|---|
| ? | ? |
| ? | ? |
| ? | fail |
| fail | ? |
| ? | ? |
| ? | 5 |
| ? | ? |
| ? | ? |
| ? | 2 |
| ? | ? |

| H | ? | ? | ? | fail | ? | ? | ? | ? | ? | ? |
|---|---|---|---|------|---|---|---|---|---|---|
| N | ? | 2 | ? | ? | 5 | ? | ? | fail | 9 | ? |

Fig. 13

| H | ? | ? | 10 | ? | ? | fail | ? | ? | ? |
|---|---|---|----|---|---|------|---|---|---|
| N | ? | 2 | ?  | 5 | ? | ?    | fail | 9 | ? |

Fig. 14

| H | ? | ? | ? | 10 | ? | ? | fail | ? | ? | ? |
|---|---|---|---|----|---|---|------|---|---|---|
| N | ? | 2 | ? | ?  | 5 | ? | ?    | fail | 9 | fail |

| H | 3 | ? | ? | 10 | ? | ? | fail | ? | ? | ? |
|---|---|---|---|----|---|---|------|---|---|---|
| N | ? | 2 | ? | ?  | 5 | ? | ?    | fail | 9 | fail |

ANALYSIS DEVICE, ANALYSIS METHOD, AND ANALYSIS PROGRAM

CROSS-REFERENCE TO RELATED APPLICATION

The present application is based on PCT filing PCT/JP2020/007268, filed Feb. 21, 2020, the entire contents of which are incorporated herein by reference.

TECHNICAL FIELD

The present invention relates to an analysis device, an analysis method, and an analysis program.

BACKGROUND ART

A known parser converts data into a form that can be handled by a computer. The parser analyzes data according to a language describing a conversion source pattern (hereinafter simply referred to as a language) and converts the data.

For example, a parser describes a pattern in a language obtained by extending a regular expression and analyzes data using a parsing algorithm based on backtracking. Further, a known parser analyzes a context-dependent pattern using, for example, a parsing algorithm called stateful packrat parsing in which a pattern is described in a language obtained by extending PEG (parsing expression grammar) (for example, see NPL 1 and NPL 2).

CITATION LIST

Non Patent Literature

NPL 1: KURAMITSU, K., "Nez: Open grammar language and tools" (URL: nez-peg.github.io/)
NPL 2: GIETZEN, J., "Pegasus: Super-easy peg parsing for .net" (URL: otac0n.com/Pegasus/)

SUMMARY OF THE INVENTION

Technical Problem

However, a parser corresponding to a context-dependent pattern in the related art has a difficulty: analysis may take a vast amount of time. For example, in the parser described in NPL 1 and NPL 2, an operation of an exponential function time may be required for a size of data.

Means for Solving the Problem

In order to solve the above-described difficulty and achieve the object, an analysis device includes: processing circuitry configured to: a perform parsing on a first character string based on a grammar described in a PEG in which a variable is associated with a predetermined terminal symbol; add, to the variable, an element in which a predetermined attribute is imparted to a part of the first character string, the part being a second character string analyzed as corresponding to the terminal symbol extract an element that is latest from elements of each predetermined attribute from the variable; and determine whether the element extracted satisfies a predetermined condition regarding a context.

Effects of the Invention

According to the present invention, it is possible to shorten a time required for parsing corresponding to a context-dependent pattern.

BRIEF DESCRIPTION OF DRAWINGS

FIG. 3 is a diagram illustrating a syntax of V-PEG.
FIG. 5 is a diagram illustrating an algorithm of a parse function.
FIG. 8 is a diagram illustrating an exemplary memo table.
FIG. 9 is a diagram illustrating an exemplary memo table.
FIG. 10 is a diagram illustrating an exemplary memo table.
FIG. 11 is a diagram illustrating an exemplary memo table.
FIG. 12 is a diagram illustrating an exemplary memo table.
FIG. 13 is a diagram illustrating an exemplary memo table.
FIG. 14 is a diagram illustrating an exemplary memo table.
FIG. 15 is a diagram illustrating an exemplary memo table.
FIG. 16 is a diagram illustrating an exemplary memo table.

DESCRIPTION OF EMBODIMENTS

Hereinafter, embodiments of an analysis device, an analysis method, and an analysis program according to the present application will be described in detail with reference to the drawings. The present invention is not limited to the embodiments that will be described below.

Configuration of First Embodiment

Figure 1:
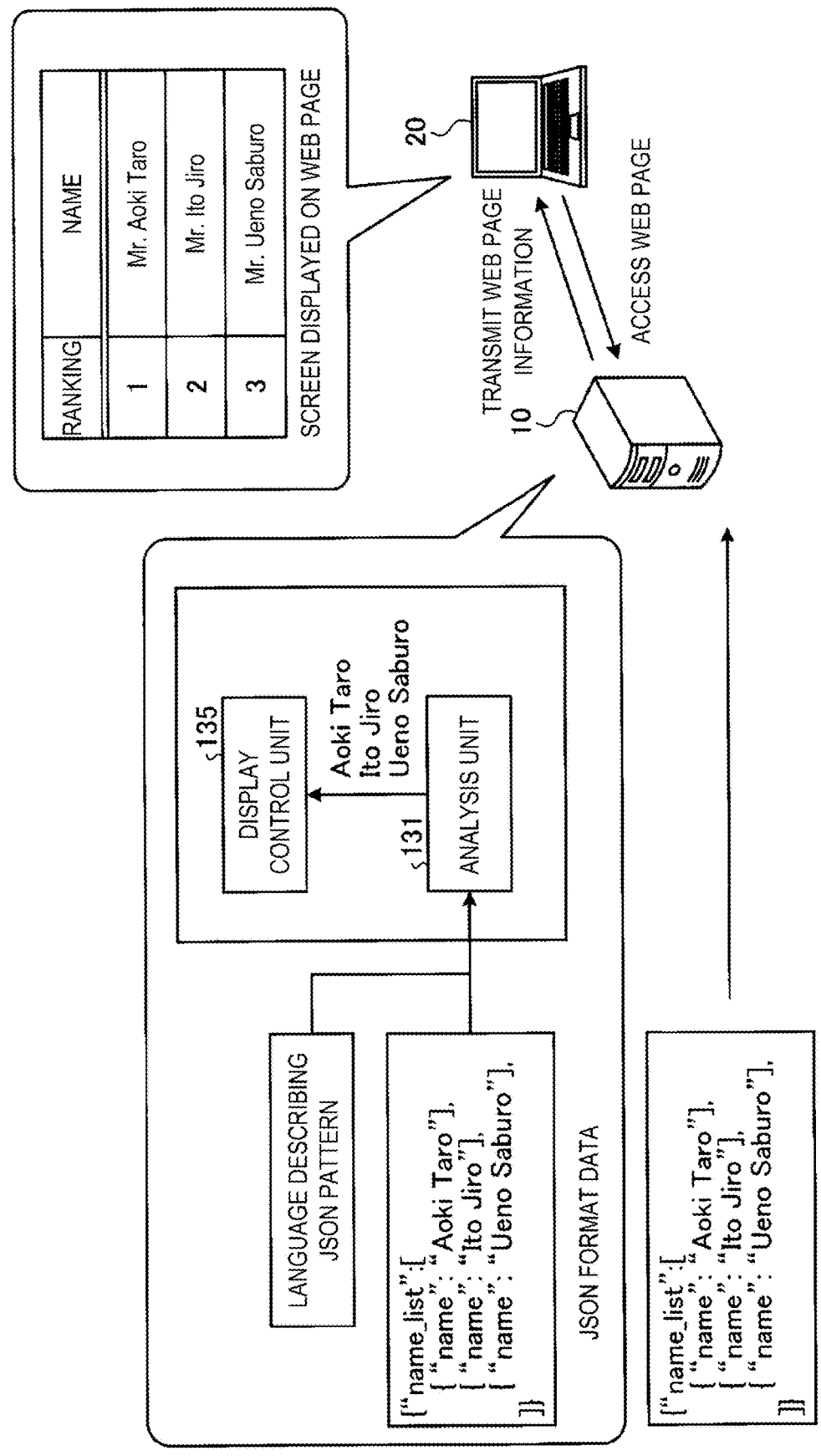
FIG. 1 is a diagram illustrating an exemplary configuration of a display system according to a first embodiment.

FIG. 1 is a diagram illustrating an exemplary configuration of a display system according to a first embodiment. As illustrated in FIG. 1, the display system includes an analysis device 10 and a display device 20. The analysis device 10 is, for example, a server. The display device 20 is, for example, a personal computer.

The analysis device 10 receives inputs of information on language describing a pattern and data of a character string in a predetermined format (hereinafter, this may be simply referred to as a character string). An analysis unit 131 of the analysis device 10 performs parsing on the character string. A display control unit 135 of the analysis device 10 generates information on a web page based on results of the parsing, and transmits the information to the display device 20.

The display device 20 displays a web page by using a function such as a browser based on the information on the web page received from the analysis device 10. The analysis device 10 may start parsing processing in response to a request for access to the web page from the display device 20.

In the example of FIG. 1, the analysis device 10 receives inputs of information on a language describing a JSON pattern, and a JSON format data. The analysis unit 131 extracts the person's name from the JSON format data. The display control unit 135 performs rendering on the web page on which the extracted person's name is displayed.

Figure 2:
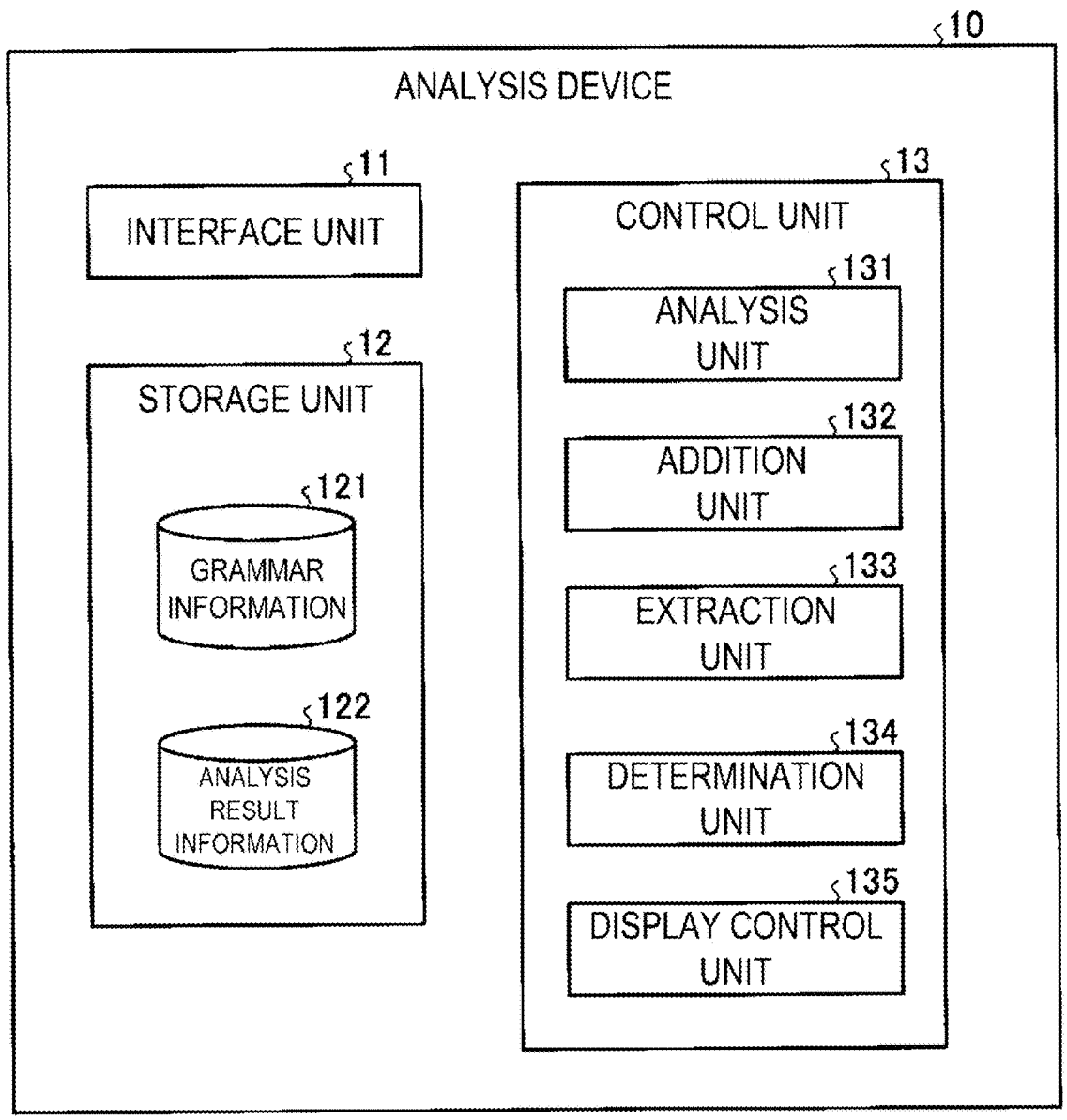
FIG. 2 is a diagram illustrating an exemplary configuration of an analysis device according to the first embodiment.

FIG. 2 is a diagram illustrating an exemplary configuration of the analysis device according to the first embodiment. As illustrated in FIG. 2, the analysis device 10 includes an interface unit 11, a storage unit 12, and a control unit 13.

The interface unit 11 is an interface for inputting and outputting data. The interface unit 11, for example, receives an input of data from an input device such as a mouse or a keyboard. Further, the interface unit 11, for example, outputs output data to an output device such as a display. Further, the interface unit 11 may be a communication interface such as a network interface card (NIC) for communication of data with another device.

The storage unit 12 is a storage device such as a hard disk drive (HDD), a solid state drive (SSD), or an optical disc. The storage unit 12 may be a semiconductor memory capable of rewriting data, such as a random access memory (RAM) or a flash memory, and a non volatile static random access memory (NVSRAM). The storage unit 12 stores an operating system (OS) or various programs that are executed in the analysis device 10. The storage unit 12 stores grammar information 121 and analysis result information 122, for example.

The grammar information 121 is information on a language describing a predetermined pattern. For example, the grammar information 121 is information described in V-PEG, which will be described below. The grammar information 121 may be stored in the storage unit 12 in advance, or may be input to the analysis device 10 along with a character string that is an analysis target.

The analysis result information 122 is information indicating a progress of parsing and a final result. For example, the analysis result information 122 may include a memo table used in packrat parsing, which will be described below.

The control unit 13 controls the entire analysis device 10. The control unit 13 is, for example, an electronic circuit such as a central processing unit (CPU) or a micro processing unit (MPU), or an integrated circuit such as an application specific integrated circuit (ASIC) or a field programmable gate array (FPGA). Further, the control unit 13 includes an internal memory for storing programs that define various processing procedures or control data, and executes each processing using the internal memory. Further, the control unit 13 functions as various processing units by various programs being operated. For example, the control unit 13 includes an analysis unit 131, an addition unit 132, an extraction unit 133, a determination unit 134, and a display control unit 135.

The analysis unit 131 performs parsing on a first character string based on a grammar described in a PEG in which a variable is associated with a predetermined terminal symbol. The analysis unit 131 receives inputs of the grammar information 121 and an analysis target, and outputs the analysis result information 122.

Here, in the present embodiment, PEG in which a variable is associated with a predetermined terminal symbol is called parsing expression grammar with variable bindings (V-PEG). A grammar G in V-PEG is expressed as G=(N, Σ, R, V, es), where N is a finite set of nonterminal symbols; Σ is a finite set of terminal symbols; R is a finite set of rules; V is a finite set of variables; and es is a starting expression. The rule is described as A=e. Here, A∈N. Further, e is as illustrated in FIG. 3. FIG. 3 is a diagram illustrating a syntax of V-PEG.

Figure 4:
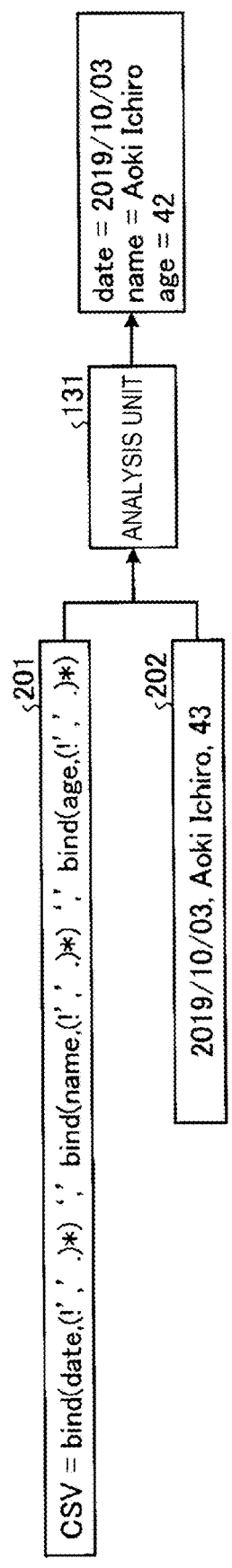
FIG. 4 is a diagram illustrating inputs and an output of parsing.

FIG. 4 is a diagram illustrating inputs and an output of parsing. As illustrated in FIG. 4, the analysis unit 131 receives inputs information 201 described in V-PEG and a character string 202. The analysis unit 131 outputs an analysis result. Here, the analysis unit 131 receives an input of information in which a pattern of CSV is described in V-PEG, and outputs data in which item names such as date, name, and age are associated with each item value as a final analysis result.

Here, packrat parsing is known as a parsing scheme for analyzing a pattern that does not depend on a context. In the packrat parsing, recursive descent parsing, backtracking, and memoization are performed. A packrat parser, which is a parser having packrat parsing implemented therein, has a parse function for parsing corresponding to a grammar. The parse function is expressed as follows when N is a set of nonterminal symbols and I is a set of positions on the input.

parse: N×I→I

In the packrat parsing, because a variable associated with the terminal symbol is unnecessary, for example, a description is as follows in a grammar of the HTML.

HTML::='<'Name'>'HTML*'</'Name'>'|'<'Name'>'2
Name::=[a-zA-Z]+

On the other hand, stateful packrat parsing, which is a parsing scheme obtained by extending packrat parsing, analyzes context-dependent patterns. In the stateful packrat parsing, a grammar is described by an extended Backus-Naur form (EBNF) and three functions (scope, bind, match) as will be described below.

<EBNF>
HTML=scope('<'bind (v, Name)'>' HTML*'</'match (v, Name)'>')|'<'Name'>'
Name=[a-zA-Z]+

Note that scope, bind, and match are functions used to check a correspondence between tags in HTML files. In this case, when an HTML file with consecutive open tags (for example, <a><b><c> . . . ) is given as an input to a stateful packrat parser of the related art, a processing time becomes longer exponentially in proportion to the number of open tags, as known.

Here, it is known that a context-dependent pattern required for practical use can be expressed by using only some functions (see, for example, Reference 1).

Reference 1: KURAMITSU, K., "A symbol-based extension of parsing expression grammars and context-sensitive parsing" in Proceedings of the 10th ACM SIGPLAN International Conference on Software Language Engineering (New York, NY, USA, 2017), SLE 2017, ACM, pp. 26-37.

Thus, in the present embodiment, a grammar is described using V-PEG including only minimum necessary functions, instead of including all sorts of functions as in stateful packrat parsing. For example, in V-PEG, a grammar is described as follows.

<V-PEG>
HTML=scope ('<'bind (v, Name)'>'HTML*'</'match (v, Name)'>')/'<'Name'>'
Name=[a-zA-Z]+
In this example, a grammar G is expressed as follows:
G=(N, Σ, R, V, es)
N={HTML, Name}
I={'<', '>', '/', 'a', . . . , 'z', 'A', . . . , 'Z'}
R: A set of rules of the HTML and Name
V={v}
es=HTML In EBNF, a plurality of expressions are separated by a symbol "I", whereas in V-PEG, a plurality of expressions are separated by a symbol "/". For example, in the above V-PEG, two expressions of the HTML "scope ('<'bind (v, Name)'>'HTML*'</'match (v, Name)'>')" and "'<'Name'>'" are separated by the symbol "/".

For example, when there are two expressions a and p, "alp" is described in EBNF. On the other hand, in V-PEG, "a/p" is described. Here, for alp, a determination as to whether the character string matches R is performed even when the character string matches a, while for a/p, a determination as to whether the character string matches R is not performed when the character string matches a.

For example, in the embodiment, when the character string does not match an expression "scope ('<'bind(v, Name)'>'HTML*'</'match (v, Name)'>')", the analysis unit 131 analyzes whether the character string matches "'<' Name '>'".

The addition unit 132 adds, to variables, an element in which a predetermined attribute is imparted to a part of the first character string, which is the second character string analyzed as corresponding to the terminal symbol by the analysis unit 131. For example, the addition unit 132 adds a key-value format element having an attribute as a key and the second character string as a value to a right end of the variable that is an array. The addition unit 132 receives inputs of the character string and the attribute, and outputs the element or a variable with the element added thereto.

Here, attributes may be an "open tag" and a "close tag" in the case of the HTML as an example. In this case, open tags of the HTML are "<" and ">" that enclose [a-zA-Z]+, that is, only one or more uppercase and lowercase letters. On the other hand, the close tags of the HTML are "</" and ">" that enclose [a-zA-Z]+, that is, only one or more uppercase and lowercase letters.

For example, when a character string "<a><c></b>" is parsed based on a grammar of the HTML, the addition unit 132 adds elements such as ($v_1$, a), ($v_2$, b), and ($v_1$, c) to the variable $E_m$, which is an array, where $v_1$ is a key corresponding to the attribute "open tag" and $v_2$ is a key corresponding to the attribute "close tag". Further, the addition unit 132 adds new elements to the right side of the array.

The extraction unit 133 extracts the latest element of each attribute from the variable. For example, the extraction unit 133 extracts the rightmost element among elements with the same key of the array. For example, a case in which the variable $E_m=[(v_1, a), (v_2, b), (v_1, c)]$ is considered. In this case, there are two elements in which $v_1$ is a key, and the extraction unit 133 extracts a newer ($v_1$, c). The extraction unit 133 receives an input of a variable before extraction and outputs a variable after extraction. For example, the extraction unit 133 receives an input of the variable $E_m=[(v_1, a), (v_2, b), (v_1, c)]$, and outputs a variable $E_m=[(v_1, c), (v_2, b)]$ after extraction.

The determination unit 134 determines whether the element extracted by the extraction unit 133 satisfies a predetermined condition regarding a context. In the example of the HTML, the determination unit 134 determines whether the character string of the element extracted by the extraction unit 133 matches the character string in the close tag in the first character string.

When a variable after the extraction in the extraction unit 133 is $E_m=[(v_1, c), (v_2, b)]$, the determination unit 134 determines whether character strings in the open tag and the close tag are the same. In this case, because a character string of the open tag is c and a character string of the close tag is b, the determination unit 134 determines that the character strings in the open tag and the close tag are not the same. In a syntax of the HTML, because the character strings in the open tag and the corresponding close tag are the same, this determination is based on a contextual dependency of the HTML.

FIG. 5 is a diagram illustrating an algorithm of a parse function. In the parse function of the embodiment, a filter function is applied to the variable $E_m$, as illustrated in a first row of FIG. 5. The parse function in stateful packrat parsing of the related art (see Reference 2) does not include a filter function. The filter function represents processing that is executed by the extraction unit 133. The parse function of the present embodiment does not perform recording of another global variable $E_e$. Reference 2: FORD, B., "Packrat parsing:: Simple, powerful, lazy, linear time, functional pearl", in Proceedings of the Seventh ACM SIGPLAN International Conference on Functional Programming (New York, NY, USA, 2002), ICFP'02, ACM, pp. 36-47.

In the parse function in the stateful packrat parsing of the related art, all of a position i on the input, a nonterminal symbol A, and all of global variables are recorded. On the other hand, in the parse function of the present embodiment, some of the position i on the input, the nonterminal symbol A, and some of global variables are recorded. $M_s$ is a memo table, which is a function in which a four-piece set is taken as an argument and a three-piece set (i', $E_m$', $E_e$') is returned. The dom is a function for returning a definition domain of $M_s$. An arrow with a bar between a key and (j, $E_m$', $E_e$') on a fifth line is a symbol indicating that an element of $M_s$ is replaced.

Processing of First Embodiment

Figure 6:
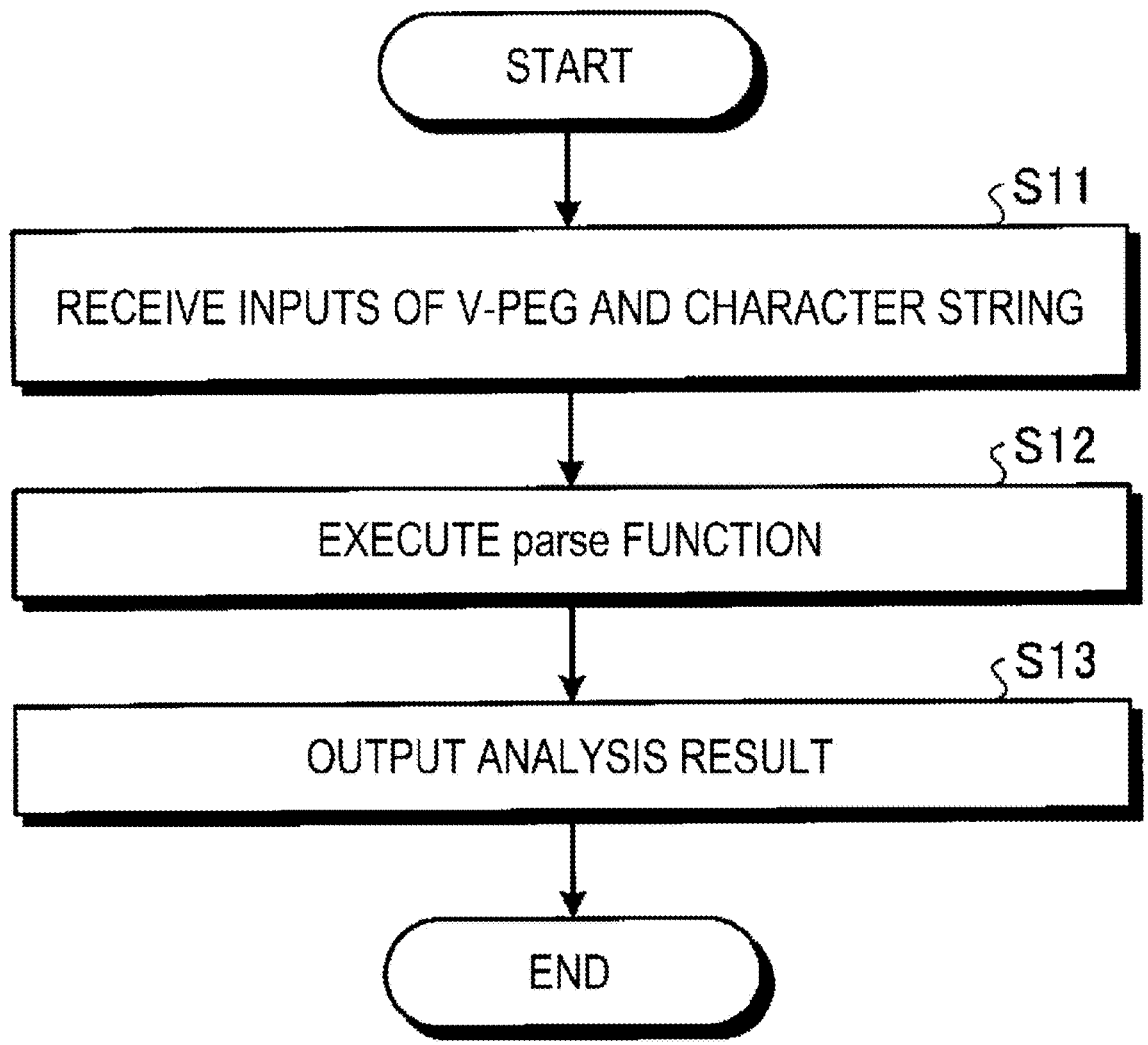
FIG. 6 is a flowchart illustrating processing of the analysis device according to the first embodiment.

FIG. 6 is a flowchart illustrating a flow of processing of the analysis device according to the first embodiment. As illustrated in FIG. 6, first, the analysis device 10 receives inputs of V-PEG and a character string (step S11). Then, the analysis device 10 executes the parse function to perform analysis (step S12). The analysis device 10 outputs am analysis results (step S13).

Figure 7:
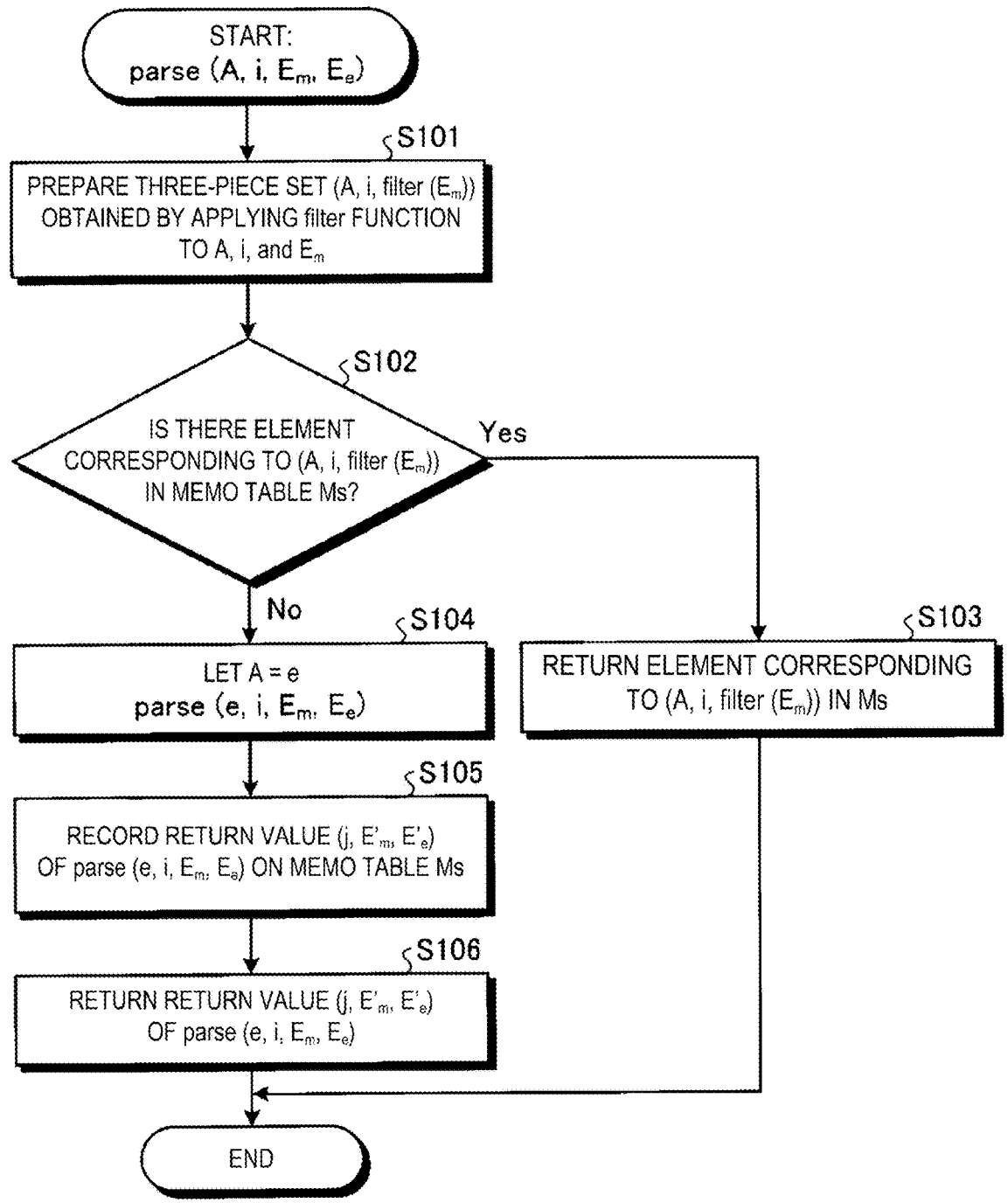
FIG. 7 is a flowchart illustrating processing of the parse function.

FIG. 7 is a flowchart illustrating a flow of processing of the parse function. FIG. 7 is a flowchart illustrating details of processing of step S12 of FIG. 6. Here, it is assumed that the analysis unit 131 executes parse (A, i, $E_m$, $E_e$). It is assumed that the variable $E_m$ is an array. Further, an initial value of i is 0. Further, A is, for example, HTML.

First, the extraction unit 133 prepares a three-piece set (A, i, filter ($E_m$)), which is obtained by applying a filter function to A, i, and $E_m$ (step S101). Then, the determination unit 134 determines whether there is an element corresponding to (A, i, filter ($E_m$)) in the memo table $M_s$ (step S102).

When there is the element corresponding to (A, i, filter ($E_m$)) in the memo table $M_s$ (steps S102: Yes), the analysis unit 131 returns elements corresponding to (A, i, filter ($E_m$)) in $M_s$ (step S103). On the other hand, when there is no element corresponding to (A, i, filter ($E_m$)) in the memo table $M_s$ (step S102: No), the analysis unit 131 executes parse (e, i, $E_m$, $E_e$) letting A=e (step S104).

Then, the analysis unit 131 records a return value (j, $E'_m$, $E'_e$) of the parse (e, i, $E_m$, $E_e$) in the memo table $M_s$ (step S105). Further, the analysis unit 131 returns the return value (j, $E'_m$, $E'_e$) of the parse (e, i, $E_m$, $E_e$) (step S106).

Effects of First Embodiment

As described above, the analysis unit 131 performs parsing on the first character string based on the grammar described in the PEG in which a variable is associated with a predetermined terminal symbol. Further, the addition unit 132 adds, to variables, an element in which a predetermined attribute is imparted to a part of the first character string, which is the second character string analyzed as corresponding to the terminal symbol by the analysis unit 131. Further, the extraction unit 133 extracts the latest element of each attribute from the variable. Further, the determination unit 134 determines whether the element extracted by the extraction unit 133 satisfies a predetermined condition regarding a context. Thus, the analysis device 10 prevents elements that are not latest among elements stored in the variable from being extracted. Thus, according to the present embodiment, it is possible to shorten a time required for parsing corresponding to a context-dependent pattern. The embodiment enables a processing time which has been increased in the exponential function time in the related art, to be curbed to a polynomial time.

The addition unit 132 adds a key-value format element having an attribute as a key and the second character string as a value to a right end of the variable that is an array. Further, the extraction unit 133 extracts the rightmost element among the elements with the same key of the array. Thus, using the array as a variable makes it possible to extract the latest elements easily.

The analysis unit 131 performs parsing on the first character string based on the HTML grammar. Further, the addition unit 132 adds, to the variable, an element in which an attribute indicating the open tag has been imparted to the character string in the open tag in the first character string. Further, the extraction unit 133 extracts latest elements among the elements with the attribute indicating the open tag. Further, the determination unit 134 determines whether the character string of the element extracted by the extraction unit 133 matches the character string in the close tag in the first character string. This makes parsing according to the syntax of the HTML possible.

Packrat Parsing

Here, packrat parsing of the related art will be described for comparison with the present embodiment. Here, it is assumed that a grammar of the HTML is described as follows.

HTML='<'Name'>' HTML*'</'Name'>'j'<'Name'>'
Name [a-zA-Z]+

A character string that is an analysis target is "<a><b></a>". Further, parse (HTML, i) is a function for parsing HTML from the position i on the input. Further, parse (Name, i) is a function for parsing Name from the position i on the input. In the parse function, a return value is uniquely determined when an argument is determined. Further, in the packrat parsing, all analysis results of the parse function are recorded in the memo table, and when the parse function is called with an already analyzed argument, the recorded analysis results are returned without the analysis being executed.

Figure 8:
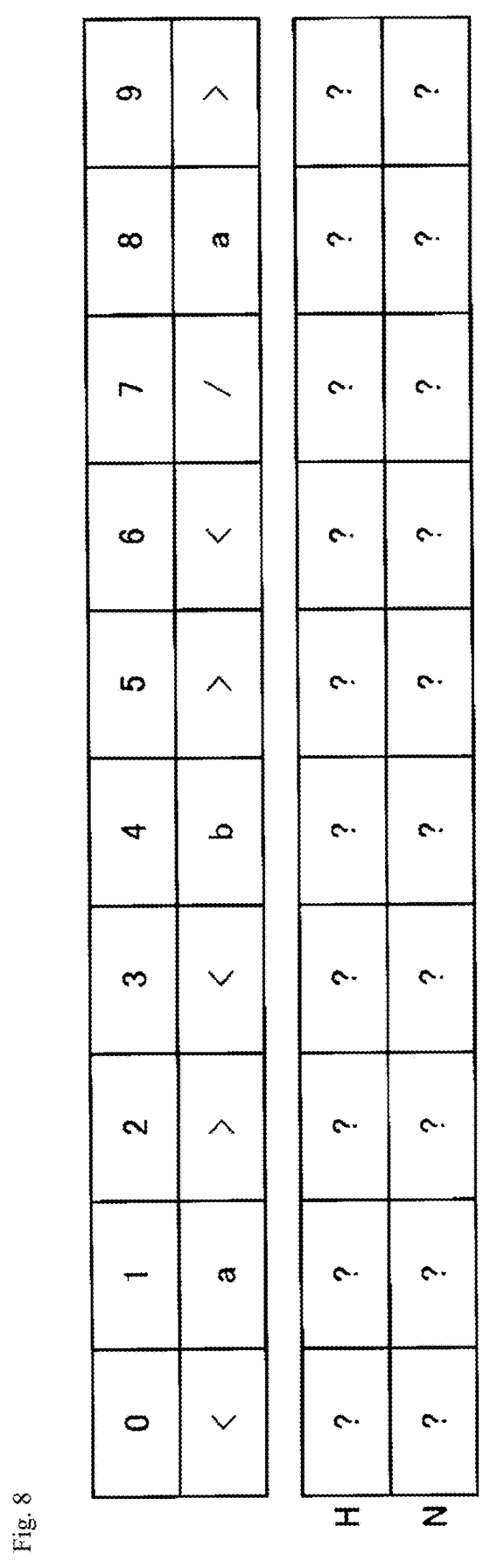
Figure 14:
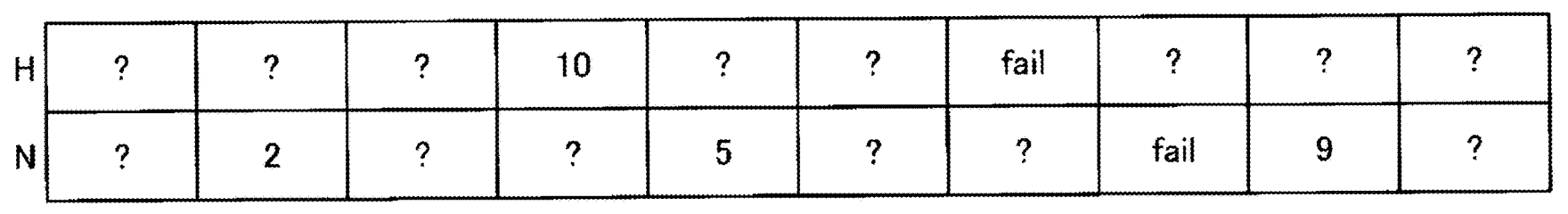
Figure 15:
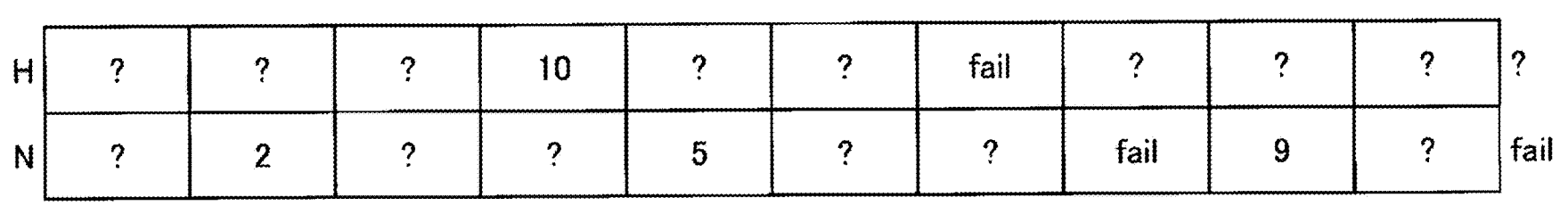

FIGS. 8 to 16 are diagrams illustrating examples of the memo table. In an upper table of FIG. 8, each of characters of a character string, which is an analysis target, and a position thereof are shown. A lower table is a memo table in which an HTML analysis result (H) and a Name analysis result (N) are recorded. "?" is an initial value (for example, Null). Here, it is assumed that an analysis device 10a performs the analysis.

Figure 9:
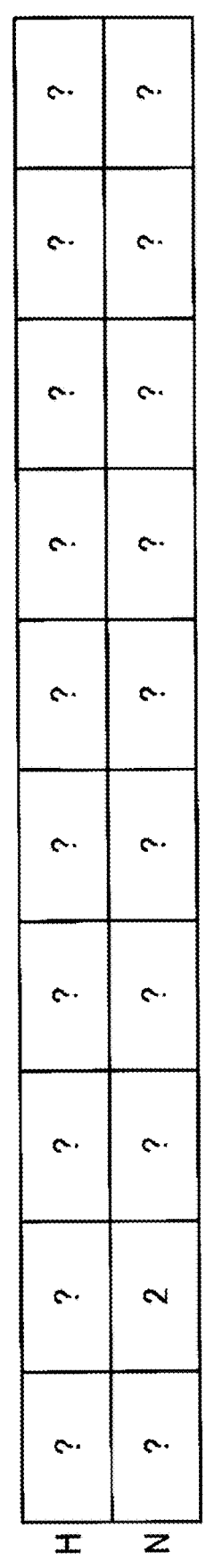

First, the analysis device 10a executes parse (HTML, 0). Here, because "a" at a position of i=1 corresponds to a Name of a terminal symbol, the analysis device 10a executes parse (Name, 1). Because ">" at a position of i=2 does not match Name, the analysis device 10a records 2 at the position of i=1 in the Name table as an analysis result of parse (Name, 1), as illustrated in FIG. 9.

Figure 10:
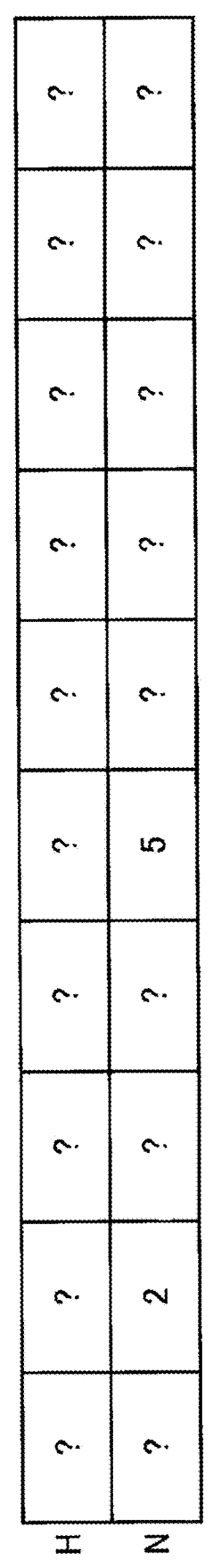

Further, because "<" at a position of i=3 corresponds to an HTML of a terminal symbol, the analysis device 10a executes parse (HTML, 3). At a position of i=4, the analysis device 10a further executes parse (Name, 4). Because ">" at a position of i=5 does not match the Name, the analysis device 10a records 5 at the position of i=4 in the Name table as an analysis result of parse (Name, 4) as illustrated in FIG. 10.

Figure 11:
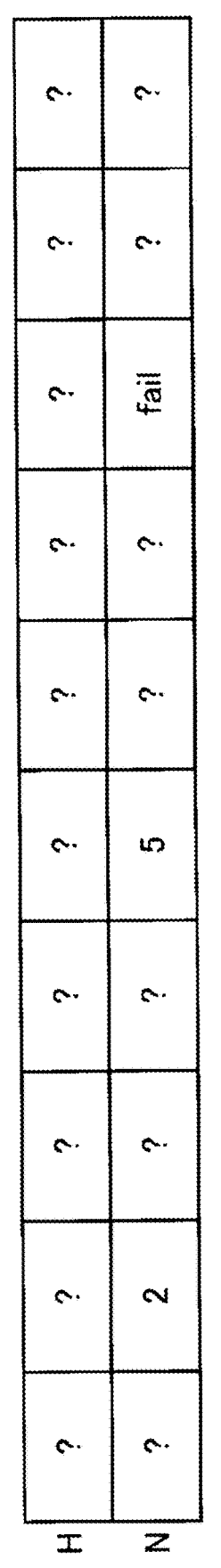

Further, because "<" at a position of i=6 corresponds to the Name of the terminal symbol, the analysis device 10a executes parse (HTML, 6). At a position of i=7, the analysis device 10a further executes parse (Name, 7). Because the "/" at the position of i=7 does not match the Name, the analysis device 10a records fail at the position of i=7 in the Name table as an analysis result of parse (Name, 7) as illustrated in FIG. 11.

Although parse (HTML, 6) fails to match, the analysis device 10a performs next conditions because there are the next conditions. The analysis device 10a backtracks to i=6 and executes parse (Name, 7) when proceeding to i=7. As illustrated in FIG. 11, because the analysis result of the position of i=7 already exists, the analysis device 10a does not perform the analysis again.

Figure 12:
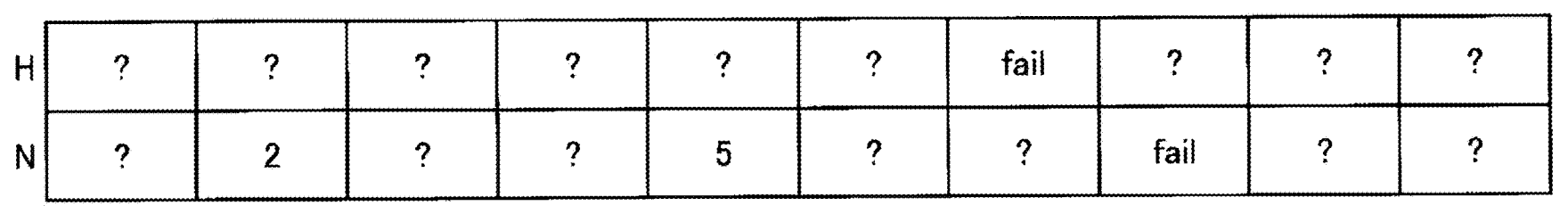

As a result, the analysis device 10a records fail, which is the analysis result of parse (HTML, 6), at the position of i=7 in the HTML table, as illustrated in FIG. 12. Further, the analysis device 10a executes parse (Name, 8) when proceeding to i=8. As a result of parse (Name, 8), because ">" at a position of i=9 does not match Name, the analysis device 10a records 9 as an analysis result of parse (Name, 8) at the position of i=8 in the Name table, as illustrated in FIG. 12.

Figure 13:
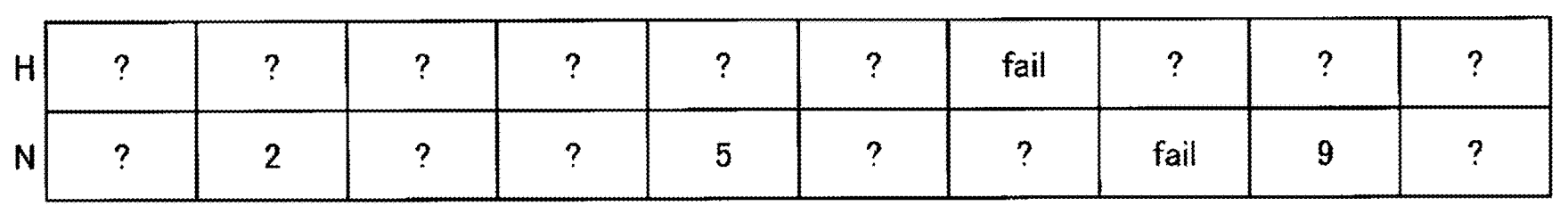
Figure 16:
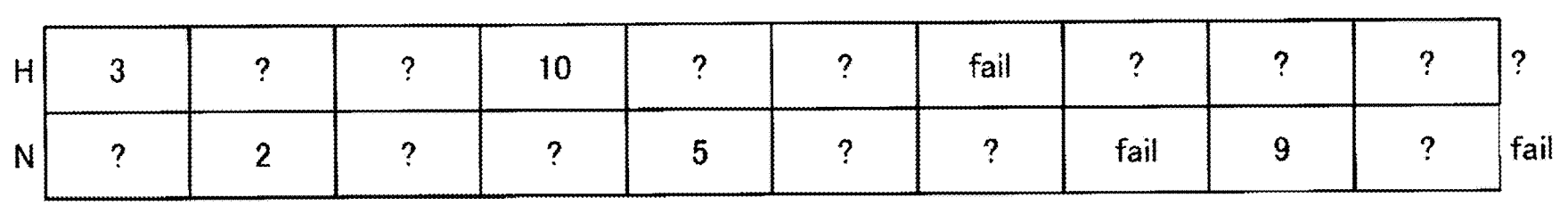

Further, because parse (HTML, 3) completely matches HTML at the position of i=9, the analysis device 10a records 10 as an analysis result of parse (HTML, 3) at the position of i=3 in the HTML table, as illustrated in FIG. 13. Here, the analysis device 10a assumes a position of i=10 and regards the parse as HTML mismatching at the position of i=10. Further, an analysis result of parse (HTML, 10) is also recorded as fail, as illustrated in FIG. 16.

The analysis device 10a backtracks to i=0. Because an analysis result of the position of i=4 already exists as illustrated in FIG. 16, the analysis device 10a does not perform the analysis again. The analysis device 10a records 3 at a position of i=0 in the HTML table as an analysis result of parse (HTML, 0).

According to this analysis result, "<a>" and "<b></a>" are separate HTML. However, in HTML, it is necessary for character strings in open and close brackets to be the same. Thus, in order to avoid such an analysis result, the determination unit 134 of the present embodiment determines whether the predetermined condition regarding a context is satisfied. Further, it is possible to shorten a processing time for a determination through the extraction processing in the extraction unit 133.

Other Embodiments

In the first embodiment, a case in which the global variable is an array has been described as an example. On the other hand, the global variable may be data other than the array. For example, the global variable may be a stack.

In this case, the addition unit 132 pushes the second character string to the stack corresponding to the attribute. The extraction unit 133 extracts a top of the stack by popping. For example, it is assumed that the stack corresponds to the opening bracket of the HTML. In this case, the addition unit 132 pushes the character string in the opening bracket to the stack as the second character string to perform addition. Thus, the latest element is at the top of the stack.

The determination unit 134 determines whether the character strings in the open tag and the close tag are the same by executing the following check function. The extraction unit 133 pushes the top of the stack S when the character string matches the close tag.

check (opening_tag):
    if $S.empty$ ( ):
    return false
    closing_tag=S.top ( )
    return opening_tag==closing_tag
    System Configuration or the Like Further, each component of each illustrated device is a functional conceptual component and does not necessarily need to be physically configured as illustrated in the drawings. That is, a specific form of distribution and integration of the respective devices is not limited to the form illustrated in the drawings, and all or some of the devices can be distributed or integrated functionally or physically in any units according to various loads, and use situations. Further, all or some of processing functions to be performed in each of the devices can be realized by a CPU and a program analyzed and executed by the CPU, or can be realized as hardware using wired logic.

Further, all or some of the processing described as being performed automatically among the processing described in the present embodiment can be performed manually, and alternatively, all or some of the processing described as being performed manually can be performed automatically using a known method. In addition, information including the processing procedures, control procedures, specific names, and various types of data or parameters illustrated in the above literature or drawings can be changed unless otherwise described.

Program

As an embodiment, the analysis device 10 can be implemented by installing an analysis program for executing the analysis processing in a desired computer as packaged software or on-line software. For example, it is possible to cause an information processing device to function as the analysis device 10 by causing the information processing device to execute the analysis program. Here, the information processing device includes a desktop or laptop personal computer. Further, a mobile communication terminal such as a smart phone, a mobile phone, or a personal handyphone system (PHS), or a slate terminal such as a personal digital assistant (PDA), for example, is included in a category of the information processing device.

Further, the analysis device 10 can be implemented as an analysis server device that provides a service regarding the above analysis processing to a client, which is a terminal device used by a user. For example, the analysis server device is implemented as a server device that provides an analysis service, which receives graph data as an input and outputs results of graph signal processing or graph data analysis. In this case, the analysis server device may be implemented as a web server, or may be implemented as a cloud that provides a service regarding the above analysis processing through outsourcing.

Figure 17:
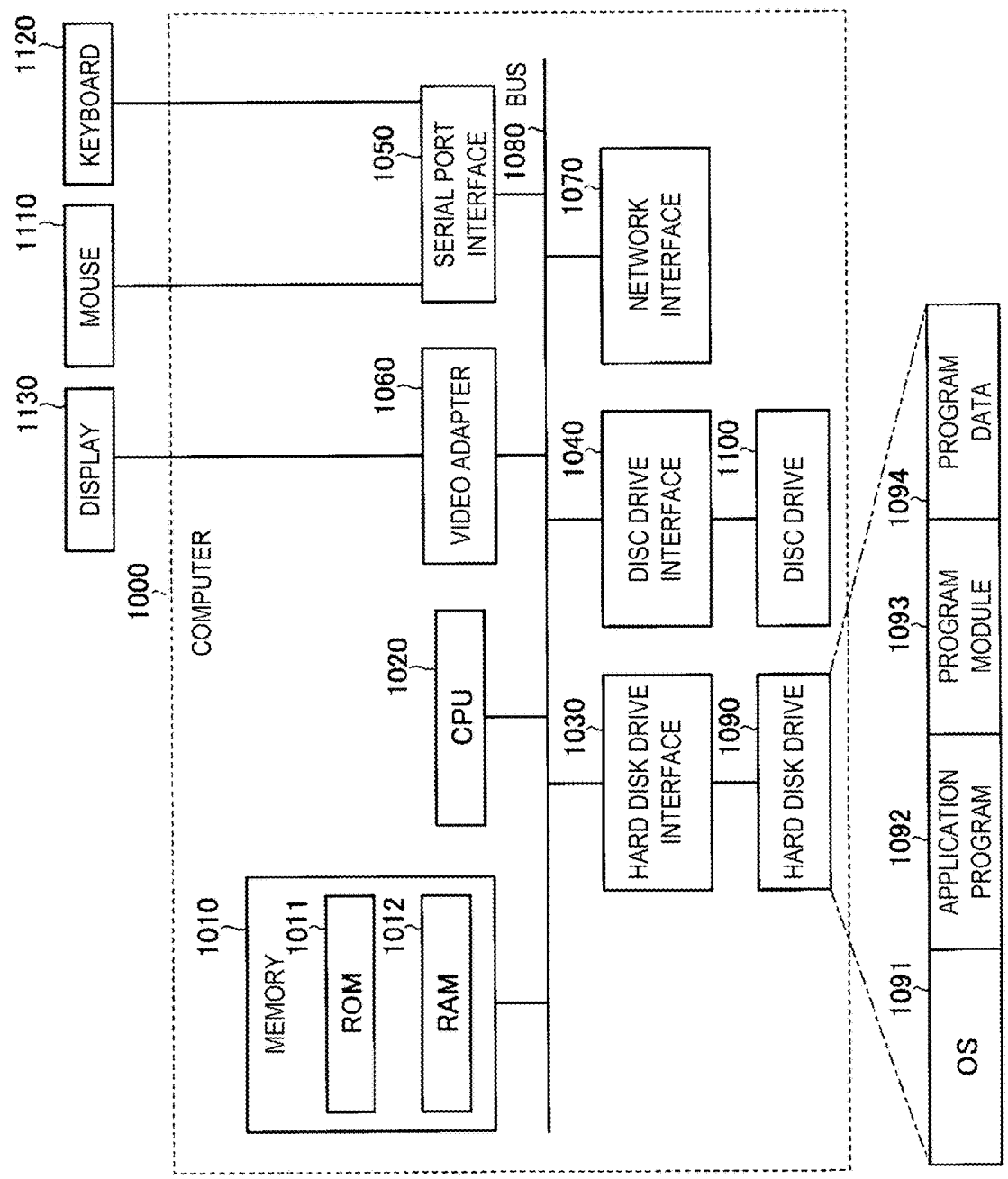
FIG. 17 is a diagram illustrating an exemplary computer that executes an analysis program.

FIG. 17 is a diagram illustrating an example of a computer that executes an analysis program. The computer 1000 includes, for example, a memory 1010 and a CPU 1020. The computer 1000 also includes a hard disk drive interface 1030, a disc drive interface 1040, a serial port interface 1050, a video adapter 1060, and a network interface 1070. Each of these units is connected by a bus 1080.

The memory 1010 includes a read only memory (ROM) 1011 and a RAM 1012.

The ROM 1011 stores, for example, a boot program such as a basic input output system (BIOS). The hard disk drive interface 1030 is connected to a hard disk drive 1090. The disc drive interface 1040 is connected to a disc drive 1100. For example, a removable storage medium such as a magnetic disk or an optical disc is inserted into the disc drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and a program data 1094. That is, a program that defines each processing of the analysis device 10 is implemented as the program module 1093 in which a code that can be executed by a computer is described. The program module 1093 is stored in, for example, the hard disk drive 1090. For example, the program module 1093 for executing the same processing as that of a functional configuration in the analysis device 10 is stored in the hard disk drive 1090. The hard disk drive 1090 may be replaced with an SSD.

Further, configuration data to be used in the processing of the embodiment described above is stored as the program data 1094 in, for example, the memory 1010 or the hard disk drive 1090. The CPU 1020 reads the program module 1093 or the program data 1094 stored in the memory 1010 or the hard disk drive 1090 into the RAM 1012 as necessary, and executes the processing of the embodiment described above.

The program module 1093 or the program data 1094 is not limited to being stored in the hard disk drive 1090, and may be stored, for example, in a detachable storage medium and read by the CPU 1020 via the disc drive 1100 or the like. Alternatively, the program module 1093 and the program data 1094 may be stored in another computer connected via a network (a local area network (LAN), a wide area network (WAN), or the like). The program module 1093 and the program data 1094 may be read from another computer via the network interface 1070 by the CPU 1020.

REFERENCE SIGNS LIST

10 Analysis device
    20 Display device
    11 Interface unit
    12 Storage unit
    13 Control unit
    121 Grammar information
    122 Analysis result information
    131 Analysis unit
    132 Addition unit 133 Extraction unit
134 Determination unit
135 Display control unit

The invention claimed is:

1. An analysis device, comprising:
processing circuitry configured to:
perform parsing on a first character string based on a grammar described in a parsing expression grammar (PEG) in which a variable is associated with a predetermined terminal symbol;
add, to the variable, an element in which a predetermined attribute is imparted to a part of the first character string, the part being a second character string analyzed as corresponding to the terminal symbol;
extract an element that is latest from elements of each predetermined attribute from the variable; and
determine whether the element extracted satisfies a predetermined condition regarding a context, preventing elements that are not latest among elements stored in the variable from being extracted.

2. The analysis device according to claim 1, wherein the processing circuitry is further configured to
add an element of a key-value format with the predetermined attribute as a key and the second character string as a value to a right end of the variable, the variable being an array, and
extract a rightmost element among elements having the same key in the array.

3. The analysis device according to claim 1, wherein the processing circuitry is further configured to
push the second character string to a stack corresponding to the predetermined attribute, and
extract a top of the stack by popping.

4. The analysis device according to claim 1, wherein the processing circuitry is further configured to
perform parsing on the first character string based on a grammar of HTML,
add, to the variable, an element in which an attribute indicating an open tag is imparted to a character string in the open tag in the first character string,
extract an element that is latest from elements of the attribute indicating the open tag, and
determine whether a character string of the element extracted matches a character string in a close tag in the first character string.

5. An analysis method executed by an analysis device, the analysis method comprising:
performing parsing on a first character string based on a grammar described in a parsing expression grammar (PEG) in which a variable is associated with a predetermined terminal symbol;
adding, to the variable, an element in which a predetermined attribute is imparted to a part of the first character string, the part being a second character string analyzed as corresponding to the terminal symbol in the parsing;
extracting an element that is latest from elements of each predetermined attribute from the variable; and
determining whether the element extracted by the extracting satisfies a predetermined condition regarding a context, preventing elements that are not latest among elements stored in the variable from being extracted.

6. A non-transitory computer-readable recording medium storing therein an analysis program that causes a computer to execute a process comprising:
performing parsing on a first character string based on a grammar described in a parsing expression grammar (PEG) in which a variable is associated with a predetermined terminal symbol;
adding, to the variable, an element in which a predetermined attribute is imparted to a part of the first character string, the part being a second character string analyzed as corresponding to the terminal symbol in the parsing;
extracting an element that is latest from elements of each predetermined attribute from the variable; and
determining whether the element extracted by the extracting satisfies a predetermined condition regarding a context, preventing elements that are not latest among elements stored in the variable from being extracted.

7. The analysis device according to claim 1, wherein the preventing elements that are not latest among elements stored in the variable from being extracted shortens a time required for parsing corresponding to a context-dependent pattern and enables a processing time to be limited to a polynomial time.

8. The analysis method according to claim 5, wherein the preventing elements that are not latest among elements stored in the variable from being extracted shortens a time required for parsing corresponding to a context-dependent pattern and enables a processing time to be limited to a polynomial time.

9. The non-transitory computer-readable recording medium according to claim 6, wherein the preventing elements that are not latest among elements stored in the variable from being extracted shortens a time required for parsing corresponding to a context-dependent pattern and enables a processing time to be limited to a polynomial time.

* * * * *